March 18, 1924.  
C. A. SILVIS  
1,487,279  
WINDING SHAFT FOR PAPER MACHINES  
Filed Dec. 8, 1922
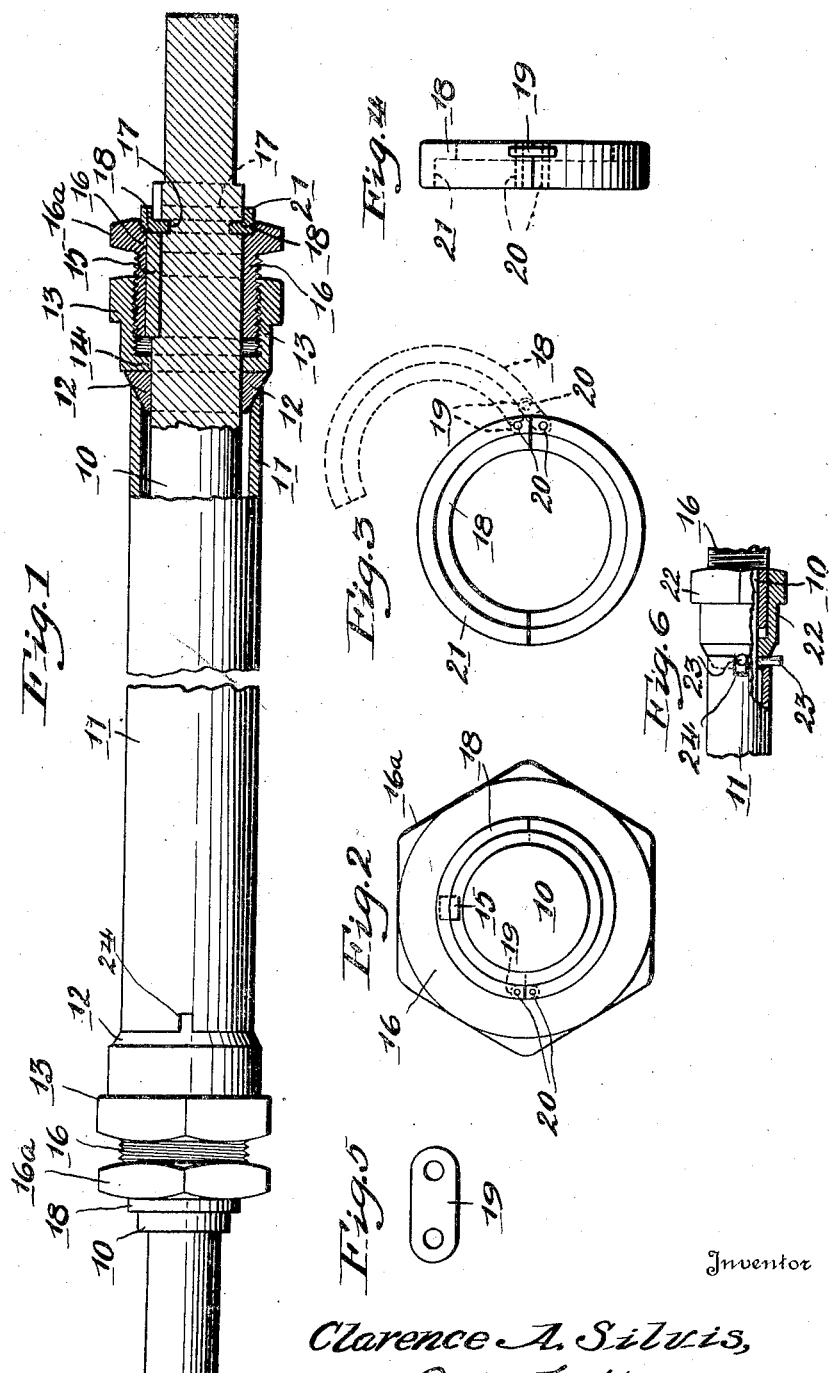
Inventor  
Clarence A. Silvis,  
By John E. Stryker  
his Attorney Patented Mar. 18, 1924.

1,487,279

UNITED STATES PATENT OFFICE.

CLARENCE ARTHUR SILVIS, OF GRAND RAPIDS, MINNESOTA, ASSIGNOR OF ONE-HALF TO THE ITASCA PAPER COMPANY, A CORPORATION OF MINNESOTA.

WINDING SHAFT FOR PAPER MACHINES.

Application filed December 8, 1922. Serial No. 605,724.

*To all whom it may concern:*

Be it known that I, CLARENCE A. SILVIS, a citizen of the United States, residing at Grand Rapids, in the county of Itasca and State of Minnesota, have invented new and useful Improvements in Winding Shafts for Paper Machines, of which the following is a specification.

This invention relates to improvements in winding shafts for paper and other machines wherein material is wound on or unwound from a spool or core.

It is my object to provide novel means for facilitating the interchange of rolls of material with empty roll cores on a supporting shaft.

More particularly it is my object to provide simple and efficient means for fastening a roll core to the shaft in a machine of this kind and at the same time to provide for the quick and easy removal of the core fastening means when it is necessary to replace one core or roll of material by another.

Other objects of my invention will appear and be more fully pointed out in the following specification and claims.

In the accompanying drawings, which illustrate the best form of my device at present known to me, Figure 1 is a side elevation of my device partially in central vertical section, a roll core being shown in place on the shaft; Fig. 2 is an end view of my device; Fig. 3 is a detail end view of the removable end thrust collar; Fig. 4 is a side elevation of the same; Fig. 5 is an enlarged detail of the small hinge plate for the thrust collar, and Fig. 6 is a side elevation, partially in section, of an alternate form of core engaging means.

Referring to the drawings I have used the numeral 10 to indicate the winding shaft of a paper machine and 11 is the hollow, cylindrical core upon which the paper is to be wound. To engage the ends of the core 11 and to center said core on the shaft 10, rings 12, formed with conical or tapered peripheries, are placed adjacent to the core 11 with their tapered peripheries extending into said core. A nut 13, formed with internal flanges 14, is placed around the shaft 10 adjacent to the ring 12 with the flange 14 bearing on the shaft 10 and abutting against said ring. Threaded within the nut 13 and secured against rotation on the shaft 10 by a key 15 is a sleeve 16. This sleeve is slidable longitudinally on the shaft 10 and on the key 15 and is provided with a hexagonal rim 16ª which may be held with a wrench to prevent rotation of said shaft when the nut 13 is turned as hereinafter described.

The shaft 10 is formed with an annular groove 17 for a removable thrust collar 18, the sleeve 16 being cut away at its inner periphery so as to normally engage the outer periphery of said collar. The collar 18, as clearly shown in Figs. 3 and 4, is divided diametrically into halves, said halves being joined by a small hinge plate 19 (Fig. 5) and pins 20. The plate 19 is positioned in a slot in the collar 18 and the pins 20 are inserted through suitable perforations in said collar and plate. To strengthen the collar 18, it is formed with an annular flange 21 which normally rests upon the periphery of the shaft 10.

An alternate form of core engaging means is shown in Fig. 6. In this form a single integral nut 22 takes the place of the nut 13 and ring 12 illustrated in Fig. 1, and one or more pins 23 are inserted in snug holes near the beveled end of the nut 22 to engage the core 11 in suitable notches 24 cut in the end thereof. This alternate form of engaging means is used where it is necessary to exert a greater torque on the core than would be possible to exert with the frictional engaging means of the preferred form.

*Operation.*

To remove the core 11 from the shaft 10, the nut 13 is first turned to draw the sleeve 16 out of engagement with the outer periphery of the thrust collar 18. This collar is now opened, as indicated in dotted lines in Fig. 3, to permit its removal from the groove 17 in the shaft 10. After removing the collar 18 from said shaft, the core 11, ring 12, nut 13, key 15 and sleeve 16 are simultaneously slid off the end of the shaft. Another roll or empty core may now be substituted for the core 11 and the several retaining parts returned to the end of the shaft in the order indicated above. To securely grip the core 11 between the tapered ring 12, it is only necessary, after replacing the thrust collar 18 in the groove 17, to turn the nut 13 in the appropriate direction and thereby simultaneously force the sleeve 16 firmly against said collar and the rings 12 against the ends of the core 11. When the core is thus secured, the collar 18 is held on the shaft by the over-hanging portion of the sleeve 16.

The operation of the alternate form of my device, illustrated in Fig. 6, is identical with that described above except that the pins 23 are inserted in the nuts 22 through the notches 24 after bringing the nuts 22 into engagement with the core 11 and said pins must first be removed before the nuts 22 can be unscrewed to remove the core.

To prevent the nut 13 (or nut 22 in the alternate form) from releasing the core 11 during the operation of winding paper thereon, the threads on the nut 13 and sleeve 16 are so directed that there will be a tendency to move the nut 13 toward the ring 12 during the winding operation. As the rings 12, at both ends of the core 11, are removable, the threads on one of the nuts 13 are made "right hand" so as to be tightened when turned in a counter clockwise direction, while those on the other nut 13 are made "left hand" and the shaft 10 is so placed in the machine that the operation of winding material on the core 11 tends to move the nuts 13 toward each other.

It will be noted that as illustrated, duplicate, removable rings are provided on the ends of the shaft 10 for engaging the core 11, but obviously many of the advantages of my device may be secured by fixing one of the rings 12 to the shaft, the other ring being removable as described above. Any such arrangement is considered within the spirit of my invention.

Having described my invention what I claim as new and desire to protect by Letters Patent is:

1. In a device of the class described, a shaft adapted to support the core of a roll, means arranged on said shaft to engage said core, thrust means removably held in a groove in said shaft, and means abutting against said thrust means and adapted to be manipulated to hold said engaging means in contact with said core.

2. In a device of the class described, a shaft adapted to support the core of a roll, a removable ring disposed to engage said core on said shaft, thrust means removably held in a groove in said shaft, and a nut and sleeve threaded one to the other between said thrust means and ring whereby said ring is held in engagement with said core.

3. In a device of the class described, a shaft adapted to be inserted axially through the core of a roll, an abutment for one end of said core on said shaft, a ring arranged on said shaft to engage the opposite end of said core, a nut slidable on said shaft, a sleeve threaded in said nut, means adapted to prevent turning of said sleeve on said shaft, and a thrust collar separable from said sleeve and removably held on said shaft thereby.

4. In a device of the class described, a shaft adapted to support the core of a roll and having an annular groove near the end of said core, a ring arranged on said shaft to engage said core, a thrust collar removably secured to said shaft in said groove, and means, interposed between said ring and collar, adapted to maintain said ring in engagement with said core.

5. In a device of the class described, a shaft adapted to be inserted axially through the core of a roll and formed with a groove near one end, an abutment for one end of said core on said shaft, a tapered ring arranged on said shaft to engage the opposite end of said core, a nut revoluble on said shaft adjacent to said ring, a sleeve threaded in said nut, a key arranged to prevent turning of said sleeve on said shaft, and a thrust collar removably held in said groove by said sleeve.

6. In a device of the class described, a shaft adapted to support the core of a roll, means arranged on said shaft to engage the end of said core, an articulated thrust collar removably secured to said shaft, and means interposed between said engaging means and collar for holding said engaging means in contact with said core.

In testimony whereof, I have hereunto signed my name to this specification.

CLARENCE ARTHUR SILVIS.